(12) United States Patent
Jin et al.

(10) Patent No.: US 12,044,523 B2
(45) Date of Patent: Jul. 23, 2024

(54) METHOD AND DEVICE FOR MEASURING TRAILER INCLUDED ANGLE, AND VEHICLE

(71) Applicant: Beijing Tusen Zhitu Technology Co., Ltd., Beijing (CN)

(72) Inventors: Yuhe Jin, Beijing (CN); Yiming Li, Beijing (CN); Nan Wu, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 416 days.

(21) Appl. No.: 17/325,151

(22) Filed: May 19, 2021

(65) Prior Publication Data

US 2021/0356261 A1  Nov. 18, 2021

Related U.S. Application Data

(63) Continuation of application No. PCT/CN2019/077074, filed on Mar. 6, 2019.

(30) Foreign Application Priority Data

Nov. 20, 2018 (CN) .......................... 201811381350.1

(51) Int. Cl.
  *G01B 11/26* (2006.01)
  *G01S 17/06* (2006.01)
  *G01S 17/89* (2020.01)
(52) U.S. Cl.
  CPC .............. *G01B 11/26* (2013.01); *G01S 17/06* (2013.01); *G01S 17/89* (2013.01)
(58) Field of Classification Search
  CPC ...... G01S 17/931; G01S 7/4808; G01S 17/89; G01S 17/42; G01S 17/87; G01S 7/4802;
  (Continued)

(56) References Cited

U.S. PATENT DOCUMENTS 10,710,585 B2 * 7/2020 Hu ............................ G06T 7/80
2008/0186204 A1  8/2008 Buckley
(Continued)

FOREIGN PATENT DOCUMENTS

CN     105488498 A    4/2016
CN     107804226 A    3/2018
(Continued)

OTHER PUBLICATIONS

Nyberg, Patrik, "Stabilization, Sensor Fusion and Path Following for Autonomous Reversing of a Full-Scale Truck and Trailer System," Master of Science in Electrical Engineering, Department of Electrical Engineering, Linköping University, 2016, 50 pages, Sweden.

(Continued)

*Primary Examiner* — Michael P Stafira
(74) *Attorney, Agent, or Firm* — Perkins Coie LLP (57) ABSTRACT

The present disclosure provides a method, an apparatus and a vehicle for trailer angle measurement, applied in a semi-trailer including a tractor and a trailer. At least one LiDAR is provided on each of two sides of a rear part of the tractor. A reflector with a reflective surface is fixedly provided at a front part of the trailer, and the reflective surface faces the LiDARs. The method includes: controlling the LiDARs to emit laser light, such that the reflective surface of the reflector reflects the laser light; controlling each of the LiDARs to receive a corresponding laser point cloud reflected by the reflector; and calculating a trailer angle based on the corresponding laser point clouds. The method and apparatus can increase the range of trailer angle measurement, such that the trailer angle can be measured even if the trailer angle is relatively large.

20 Claims, 9 Drawing Sheets

(58) Field of Classification Search
CPC .......... G01S 17/86; G01S 13/931; G01S 1/55; G01S 17/02; G01S 17/06; G01S 2013/93272; G01S 13/867; G01S 17/58; G01S 17/08; G01S 2013/93271; G01S 13/865; G01S 15/931; G01S 2013/9318; G01S 2013/93185; G01S 2013/93273; G01S 201/93274; G01S 7/4972; G01S 15/08; G01S 17/894; G01S 15/86; G01S 7/53; G01S 13/86; G01S 13/88; G01S 2013/9323; G01S 13/58; G01S 17/10; G01S 17/66; G01S 2013/9317; G01S 2013/9325; G01S 7/4817; G01S 13/04; G01S 13/42; G01S 13/426; G01S 13/765; G01S 13/87; G01S 19/49; G01S 2013/9315; G01S 2013/9316; G01S 2013/9324; G01S 2013/93277; G01S 2015/938; G01S 7/411; G01S 7/4813; G01S 7/4814; G01S 7/486; G01S 7/497; G01S 13/89; G01S 15/87; G01S 17/003; G01S 17/48; G01S 17/875; G01S 2015/937; G01S 7/2955; G01S 7/40; G01S 7/4818; G01S 7/4863; G01S 13/02; G01S 13/862; G01S 13/874; G01S 13/92; G01S 15/89; G01S 17/93; G01S 2013/93275; G01S 7/415; G01S 7/481; G01S 11/08; G01S 13/06; G01S 13/08; G01S 13/62; G01S 13/74; G01S 13/876; G01S 13/878; G01S 13/882; G01S 17/32; G01S 17/50; G01S 17/933; G01S 19/45; G01S 19/47; G01S 2013/464; G01S 2013/9314; G01S 2013/9319; G01S 5/0273; G01S 5/0284; G01S 7/41; G01S 7/412; G01S 7/51; G01S 13/343; G01S 17/88; G01S 7/4811; G01S 15/93; G01S 17/00; G01S 17/04; G01S 2013/9327; G01S 7/417; G01S 7/4815; G01S 7/484; G01S 7/4868; G01S 7/4876; G01B 11/26; G01B 11/24; G01B 11/14; G01B 17/00; G01B 7/14; G01B 7/30; G01B 11/272; G01B 21/02; G01B 21/06; G01B 11/043; G01B 15/00; G01B 21/045; G01B 21/08; G01B 21/22; G01B 5/0025; B62D 53/00

See application file for complete search history.

(56) References Cited

U.S. PATENT DOCUMENTS

| | | | | |
|---|---|---|---|---|
| 2019/0235519 A1* | 8/2019 | Carter | .................. | B60W 30/00 |
| 2020/0143174 A1* | 5/2020 | Luo | ...................... | G01S 17/931 |

FOREIGN PATENT DOCUMENTS

| | | | | |
|---|---|---|---|---|
| CN | 107976194 A | | | 5/2018 |
| CN | 108278981 A | | | 7/2018 |
| CN | 108761481 A | * | | 11/2018 |
| CN | 108761481 A | | | 11/2018 |
| JP | 2001334966 A | | | 12/2001 |
| JP | 2002053082 A | * | | 2/2002 |
| JP | 2002053082 A | | | 2/2002 |

OTHER PUBLICATIONS

European Patent Office, Extended European Search Report for EP 19887255, Mailing Date: Jul. 8, 2022, 10 pages.

Chinese Patent Office, Notice of Re-examination for Appl. No. 201811381350.1, mailed on May 26, 2023, 27 pages with English translation.

Development and application technology of DSP, Edited by Zeng Yifang, Beijing University of Aeronautics and Astronautics Press, Jan. 2008, p. 614, with English translation.

Multi-source Lidar data integration technology and its application Integration and Applications of Multi-Source LiDAR Data, edited by Wang Guofeng et al., Surveying and Mapping Press, Nov. 2012, p. 70, with English translation.

Chinese Patent Office, Decision of Re-Examination for CN Appl. No. 201811381350.1, mailed on Aug. 8, 2023, 17 pages with English translation.

International Application No. PCT/CN2019/077074, International Preliminary Report on Patentability, Mailed May 25, 2021, pp. 1-4.

International Application No. PCT/CN2019/077074, International Search Report and Written Opinion Mailed Aug. 1, 2019, pp. 1-13.

Chinese Application No. 2018113813501, First Search Mailed Oct. 21, 2020 pp. 1-2.

Chinese Application No. 2018113813501, First Office Action Mailed Oct. 28, 2021, pp. 1-8.

Chinese Application No. 2018113813501, Second Office Action Mailed Apr. 2, 2021, pp. 1-12.

Australian Patent Office, Examination Report No. 1 for AU Appl. No. 2019382367, mailed on May 29, 2024, 3 pages.

* cited by examiner

METHOD AND DEVICE FOR MEASURING TRAILER INCLUDED ANGLE, AND VEHICLE

CROSS-REFERENCE TO RELATED APPLICATIONS

The present disclosure is a continuation of and claims priority to and benefit of International Application No. PCT/CN2019/077074, titled "METHOD AND DEVICE FOR MEASURING TRAILER INCLUDED ANGLE, AND VEHICLE" and filed Mar. 6, 2019 which claims priority to Chinese Patent Application No. 201811381350.1, titled "METHOD AND APPARATUS FOR TRAILER ANGLE MEASUREMENT AND VEHICLE", filed on Nov. 20, 2018, the content of which is incorporated herein by reference in its entirety.

TECHNICAL FIELD

The present disclosure relates to vehicle technology, and more particularly, to a method and an apparatus for trailer angle measurement, as well as a vehicle.

BACKGROUND

Figure 1:
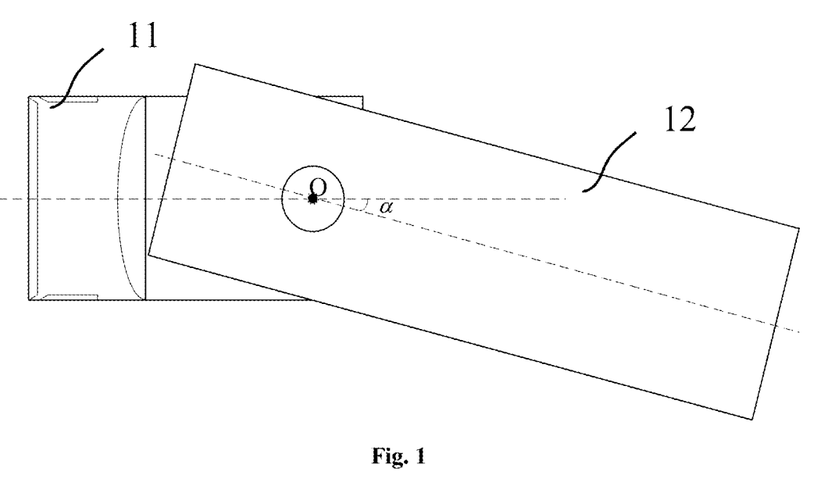
FIG. 1 is a schematic diagram showing a trailer angle.

Currently, with the development of the logistics transportation industry, vehicles with tractors and trailers (hereinafter referred to as semi-trailers), such as container trucks, are becoming increasingly popular. As a heavy transportation tool, a semi-trailer is more capable of improving overall economic benefits of road transportation than an ordinary truck. With the development of autonomous driving technology, a trailer angle (e.g., in FIG. 1 which is a top view of a semi-trailer, the trailer angle refers to the angle α between the central axis of the tractor 11 and the central axis of the trailer 12), as a basis for autonomous driving planning and control point, has become a focus of research.

The existing method for trailer angle measurement can only measure small trailer angles. When the trailer angle is relatively large (e.g., larger than ±40°), it is difficult to obtain the trailer angle accurately. Thus, how to implement fast and accurate measurement of a trailer angle with a simple structure has become a problem to be solved.

SUMMARY

The embodiments of the present disclosure provide a method and an apparatus for trailer angle measurement, as well as a vehicle, capable of achieving fast and accurate measurement of a trailer angle with a simple structure.

In order to achieve the above object, the following technical solutions are provided.

A method for trailer angle measurement is provided. The method is applied in a semi-trailer including a tractor and a trailer. At least one LiDAR is provided on each of two sides of a rear part of the tractor. A reflector with a reflective surface is fixedly provided at a front part of the trailer, and the reflective surface faces the LiDARs. The method includes: controlling the LiDAR provided on each of the two sides of the rear part of the tractor to emit laser light, such that the reflective surface of the reflector reflects the laser light emitted by the LiDAR; controlling each of the LiDARs to receive a corresponding laser point cloud reflected by the reflector; and calculating a trailer angle based on the corresponding laser point clouds received by the respective LiDARs.

An apparatus for trailer angle measurement is provided. The apparatus is applied in a semi-trailer including a tractor and a trailer. At least one LiDAR is provided on each of two sides of a rear part of the tractor. A reflector with a reflective surface is fixedly provided at a front part of the trailer, and the reflective surface faces the LiDARs. The apparatus is communicatively connected to the LiDARs. The apparatus includes a memory, a processor, and a computer program stored on the memory and executable by the processor. The processor is configured to, when executing the computer program, perform a process of trailer angle measurement. The process includes: controlling the LiDAR provided on each of the two sides of the rear part of the tractor to emit laser light, such that the reflective surface of the reflector reflects the laser light emitted by the LiDAR; controlling each of the LiDARs to receive a corresponding laser point cloud reflected by the reflector; and calculating a trailer angle based on the corresponding laser point clouds received by the respective LiDARs.

A computer readable storage medium is provided. The computer readable storage medium has a computer program stored thereon. The program, when executed by a processor, implements a process of trailer angle measurement. The process is applied in a semi-trailer including a tractor and a trailer. At least one LiDAR is provided on each of two sides of a rear part of the tractor. A reflector with a reflective surface is fixedly provided at a front part of the trailer, and the reflective surface faces the LiDARs. The process includes: controlling the LiDAR provided on each of the two sides of the rear part of the tractor to emit laser light, such that the reflective surface of the reflector reflects the laser light emitted by the LiDAR; controlling each of the LiDARs to receive a corresponding laser point cloud reflected by the reflector; and calculating a trailer angle based on the corresponding laser point clouds received by the respective LiDARs.

A vehicle is provided. The vehicle includes the above apparatus for trailer angle measurement, a tractor, and a trailer. At least one LiDAR is provided on each of two sides of a rear part of the tractor. A reflector with a reflective surface is fixedly provided at a front part of the trailer, and the reflective surface faces the LiDARs. The apparatus for trailer angle measurement is communicatively connected to the LiDARs. The apparatus for trailer angle measurement includes a memory, a processor, and a computer program stored on the memory and executable by the processor. The processor is configured to, when executing the computer program, perform a process of trailer angle measurement. The process includes: controlling the LiDAR provided on each of the two sides of the rear part of the tractor to emit laser light, such that the reflective surface of the reflector reflects the laser light emitted by the LiDAR; controlling each of the LiDARs to receive a corresponding laser point cloud reflected by the reflector; and calculating a trailer angle based on the corresponding laser point clouds received by the respective LiDARs.

With the method and apparatus for trailer angle measurement and the vehicle according to the embodiments of the present disclosure, at least one LiDAR is provided on each of two sides of a rear part of the tractor. In this way, when the trailer angle is relative large and the reflector moves to one side of the tractor, the laser light emitted by the LiDAR(s) on at least one side can still reach the reflective surface of the reflector for measurement of the trailer angle. In addition, in the present disclosure, the trailer angle is calculated based on the corresponding laser point clouds received by the respective LiDARs, instead of a laser point cloud of a single LiDAR, such that the accuracy of the result is greatly improved.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures.

DETAILED DESCRIPTION OF THE EMBODIMENTS

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In order to allow those skilled in the art to better understand the present disclosure, some of the technical terms used in the embodiments of the present disclosure will be explained as follows:

Point cloud: a set of point data on an outer surface of an object as obtained by a measuring apparatus during reverse engineering.

AOI: Area of Interest Filter, when used for filtering point cloud data, only the point cloud data in a specific area of interest is retained.

RANSAC: Random Sample Consensus algorithm, an algorithm that calculates mathematical model parameters of data based on a set of sample data containing abnormal data to obtain valid sample data.

Figure 2:
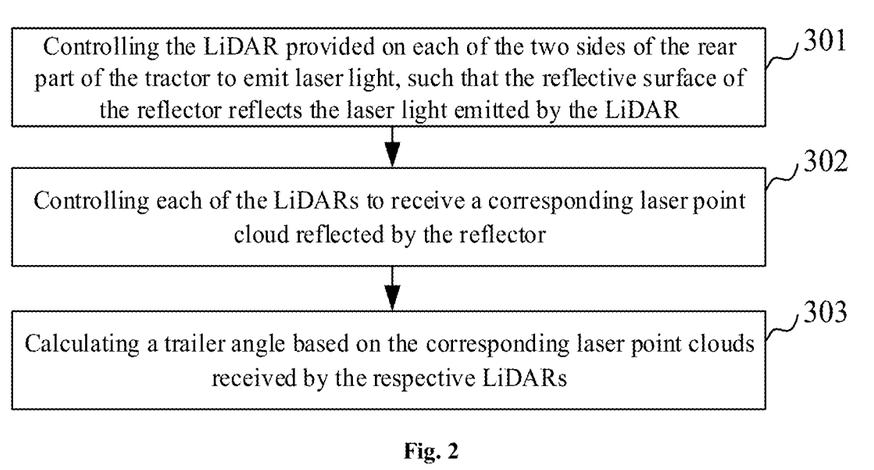
FIG. 2 is a first flowchart illustrating a method for trailer angle measurement according to an embodiment of the present disclosure.
Figure 3:
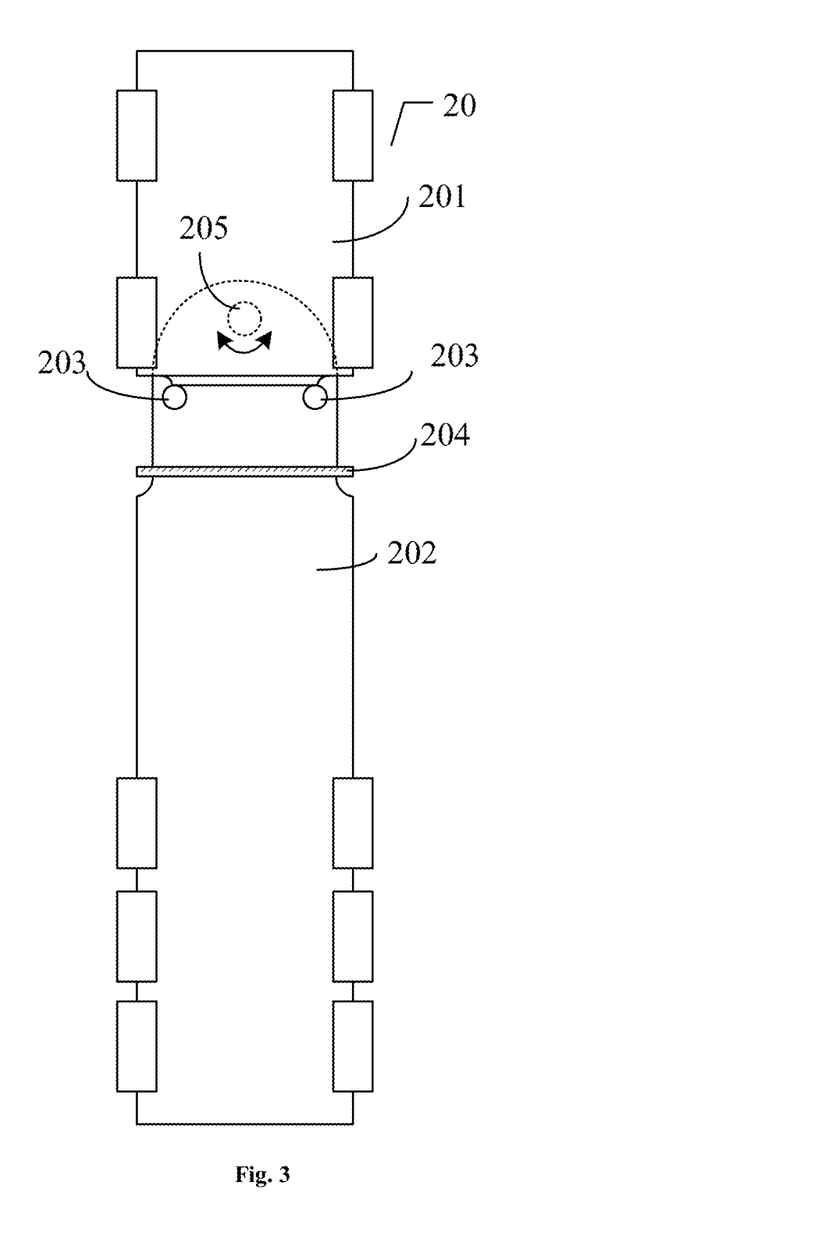
FIG. 3 is a bottom view of a structure of a semi-trailer according to an embodiment of the present disclosure.

As shown in FIG. 2, an embodiment of the present disclosure provides a method for trailer angle measurement, which is applied to a semi-trailer 20 as shown in FIG. 3 (FIG. 3 is a bottom view of the semi-trailer 20). The semi-trailer 20 includes a tractor 201 and a trailer 202. The tractor 201 and the trailer 202 are connected by a shaft 205, such that the trailer 202 can rotate with respect to the tractor 201. On each of two sides (such as the left and right sides) of a rear part of the tractor 201, at least one LiDAR 203 is provided (for example, one, two, or more LiDARs can be provided on each of the left and right sides, as shown in FIG. 3, which only shows one LiDAR on each of the left and right sides for the purpose of illustration). A reflector 204 with a reflective surface is fixedly provided at a front part of the trailer 202, and the reflective surface faces the LiDARs 203.

The method for trailer angle measurement includes the following steps.

At step 301, the LiDAR provided on each of the two sides of the rear part of the tractor is controlled to emit laser light, such that the reflective surface of the reflector reflects the laser light emitted by the LiDAR.

At step 302, each of the LiDARs is controlled to receive a corresponding laser point cloud reflected by the reflector.

At step 303, a trailer angle is calculated based on the corresponding laser point clouds received by the respective LiDARs.

Figure 4:
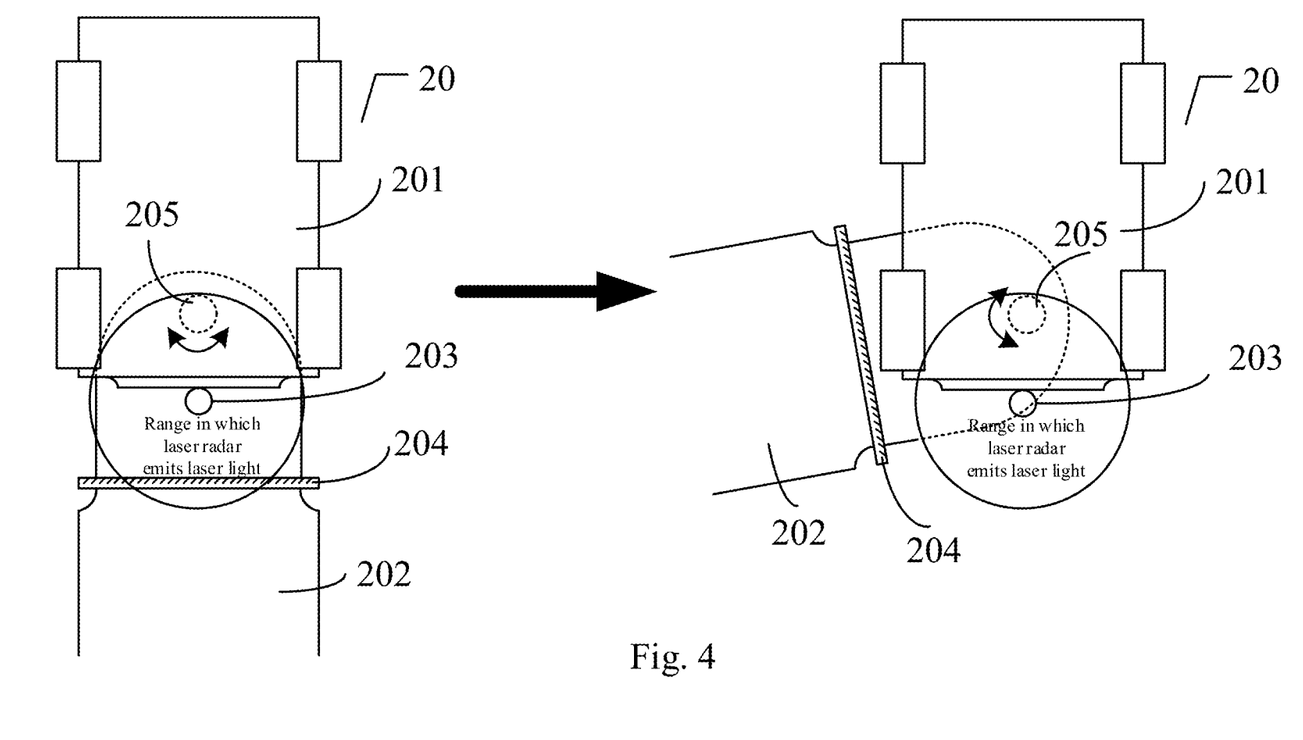
FIG. 4 is a schematic diagram showing an operation scenario in which only one LiDAR is provided at a rear part of a tractor according to an embodiment of the present disclosure.

Here, as shown in FIG. 4, only one LiDAR (typically a single-line LiDAR) 203 provided at the rear part of the tractor 201 (typically at the middle of the rear part of the tractor) can also emit laser light towards the reflective surface of the reflector 204. The one LiDAR 203 may be generally sufficient for measurement of the trailer angle. However, when the trailer angle is relatively large, as shown in FIG. 4, the reflector 204 may have moved to a side of the tractor 201, and the laser light emitted by the one LiDAR 203 cannot reach the reflective surface of the laser reflector 204, resulting in a failure in the measurement of the trailer angle.

Figure 5:
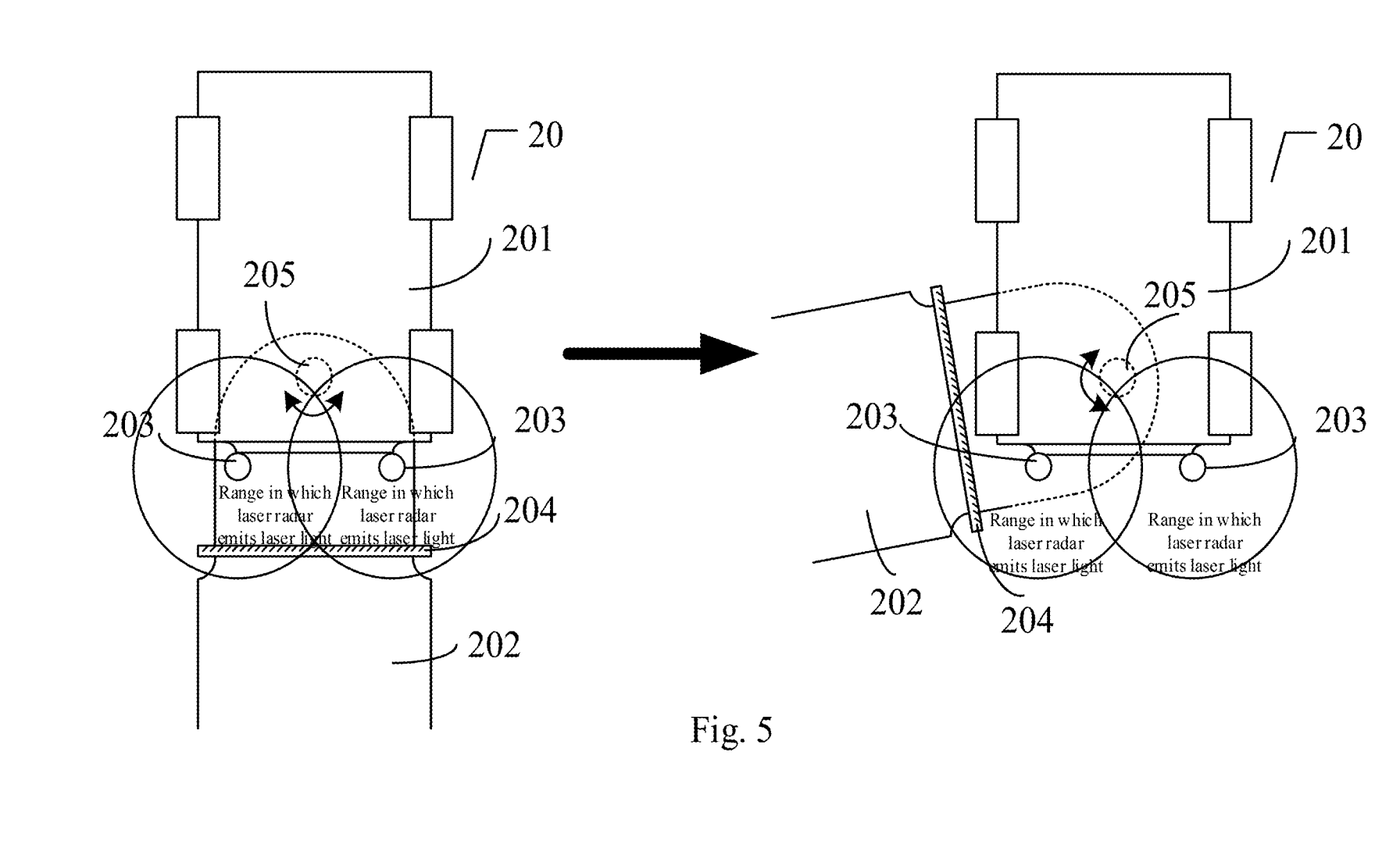
FIG. 5 is a schematic diagram showing an operation scenario in which one LiDAR is provided on each of two sides of a rear part of a tractor according to an embodiment of the present disclosure.

However, as shown in FIG. 5, in the present disclosure, on each of two sides (such as the left and right sides) of the rear part of the tractor 201, at least one LiDAR 203 is provided (for example, one, two, or more LiDARs can be provided on each of the left and right sides, as shown in FIG. 5, which only shows one LiDAR on each of the left and right sides for the purpose of illustration). When the reflector 204 moves to a side of the tractor 201, the laser light emitted by the LiDAR on at least one side can still reach the reflective surface of the reflector 204 and thus can be used for measurement of the trailer angle. In addition, in the present disclosure, the trailer angle is calculated based on the corresponding laser point clouds received by the respective LiDARs, instead of a laser point cloud of a single LiDAR, such that the accuracy of the result is greatly improved.

Figure 6:
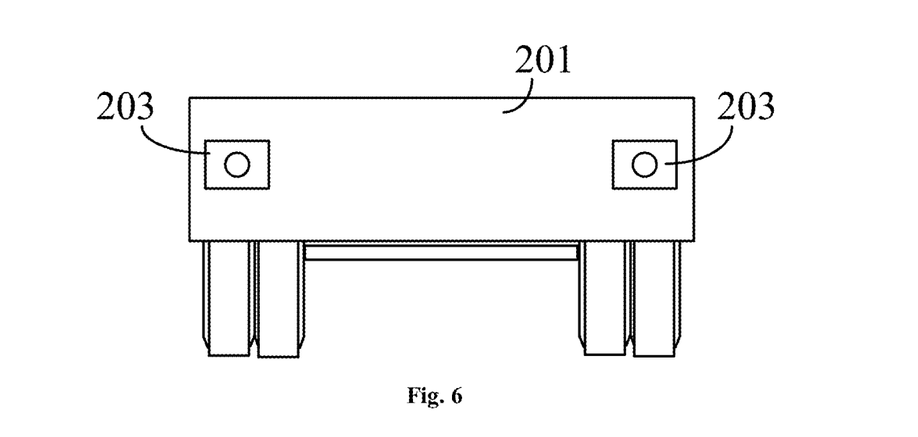
FIG. 6 is a first schematic diagram showing a distribution of LiDARs on two sides of a rear part of a tractor according to an embodiment of the present disclosure.
Figure 7:
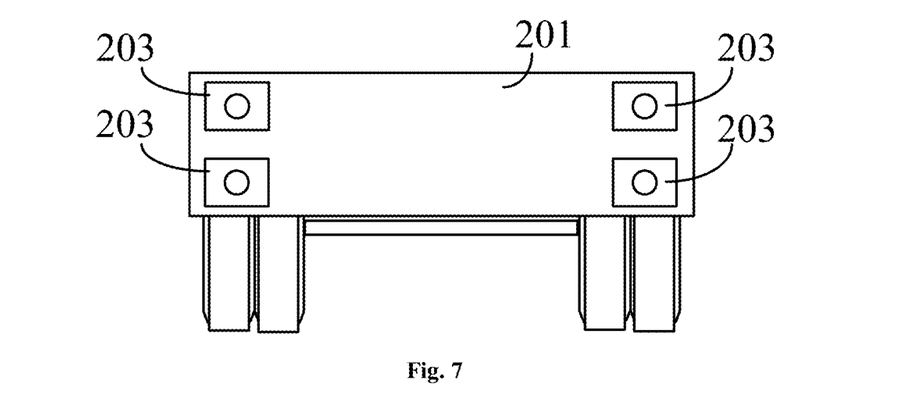
FIG. 7 is a second schematic diagram showing a distribution of LiDARs on two sides of a rear part of a tractor according to an embodiment of the present disclosure.

Here, in order to illustrate that at least one LiDAR 203 is provided on each of two sides of the rear part of the tractor 201, as shown in FIGS. 6 and 7, the distribution of the LiDARs 203 at the rear part of the tractor 201 may include one LiDAR 203 (FIG. 6), or two LiDARs 203 (FIG. 7), being provided on each of the left and right sides. However, the present disclosure is not limited to any of these examples. Without consideration for the cost, even more LiDARs can be provided on the left and right sides.

Figure 8:
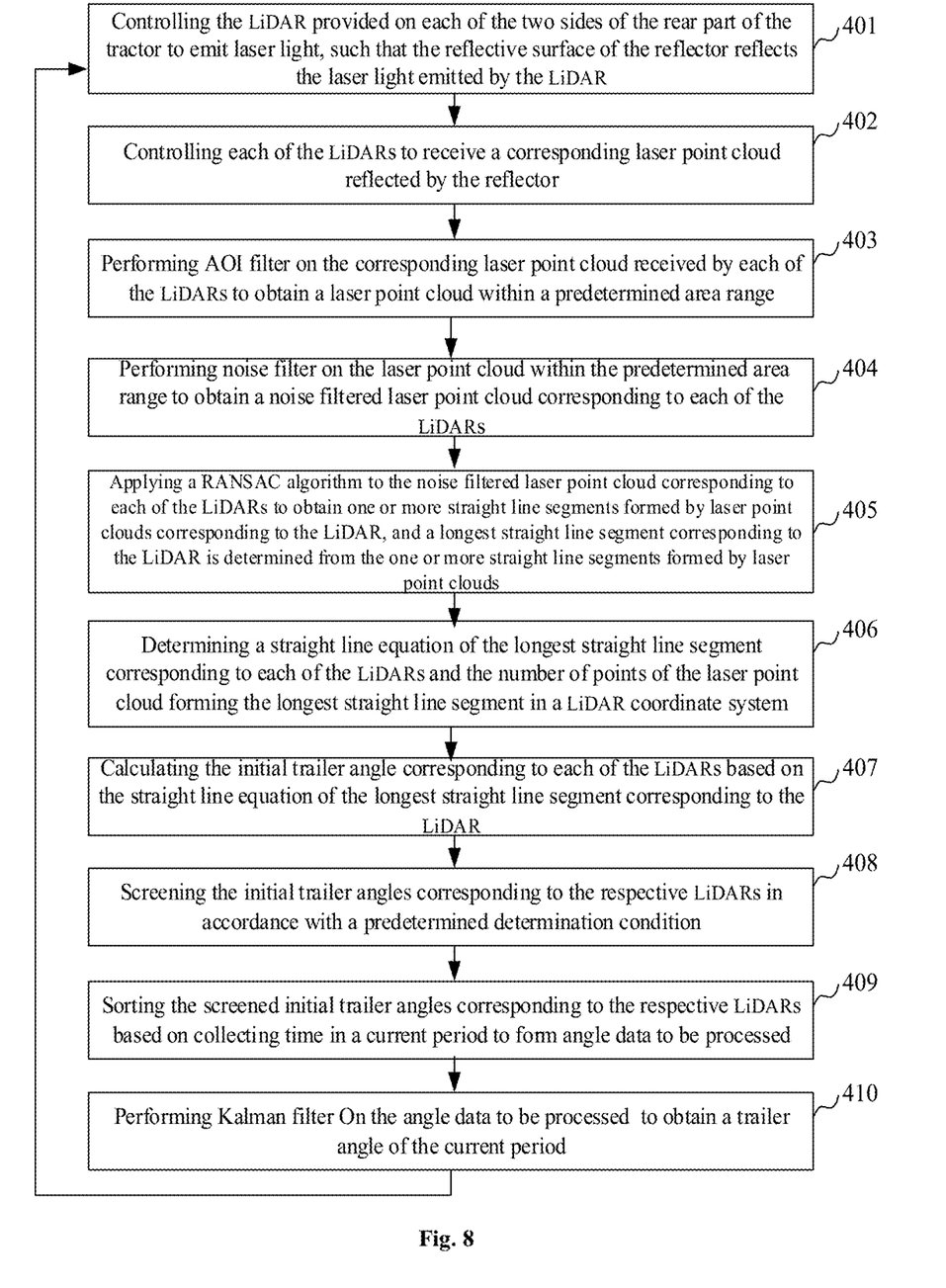
FIG. 8 is a second flowchart illustrating a method for trailer angle measurement according to an embodiment of the present disclosure.

In order to enable those skilled in the art to better understand the present disclosure, a more detailed embodiment will be given below. As shown in FIG. 8, an embodiment of the application provides a method for trailer angle measurement, which can be applied to the above semi-trailer 20 as shown in FIG. 3. The structure of the semi-trailer 20 has been described above and will not be repeated here. The method includes the following steps.

At step 401, the LiDAR provided on each of the two sides of the rear part of the tractor is controlled to emit laser light, such that the reflective surface of the reflector reflects the laser light emitted by the LiDAR.

Typically, in order to facilitate application in a vehicle environment and meeting of reflection requirements, the reflector can be made of steel, but the present disclosure is not limited to this.

In addition, the LiDARs used in the embodiment of the present disclosure may typically be a single-line LiDAR, or a multi-line LiDAR such as 4-line, 8-line, 16-line, 32-line, 64-line LiDARs, etc., and the present disclosure is not limited to any these examples.

At step 402, each of the LiDARs is controlled to receive a corresponding laser point cloud reflected by the reflector.

Typically, the sampling frequency of each LiDAR can be 10 Hz, but the present disclosure is not limited to this. In addition, each LiDAR can emit laser light with its own identification, so as to ensure that when the LiDAR receives the laser point cloud reflected by the reflector, it can only receive its corresponding laser point cloud, without receiving the laser point clouds corresponding to other LiDARs. In addition, in order to sort initial trailer angles corresponding to the respective LiDARs based on collecting time in a current period at step 409 later, the collecting time of the respective LiDARs is preferably different, so as to avoid two or more initial trailer angles being collected at the same time and difficult to be distinguished from one another.

At step 403, AOI filter is performed on the corresponding laser point cloud received by each of the LiDARs to obtain a laser point cloud within a predetermined area range.

Here, the predetermined area range is determined based on a range of motion of the reflector along with the trailer around the tractor. For example, the following schemes can be used.

Figure 9:
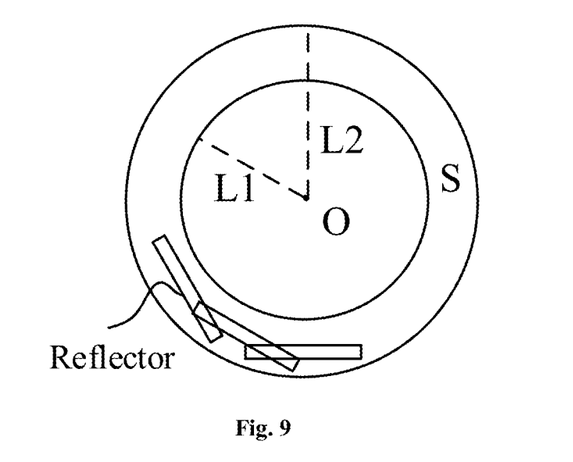
FIG. 9 is a schematic diagram showing a range of motion of a reflector along with a trailer around a tractor according to an embodiment of the present disclosure.

As shown in FIG. 9, a first distance L1 and a second distance L2 can be predetermined based on the range of motion of the reflector along with the trailer around the tractor. Here, the second distance L2 is greater than the first distance L1. A first circular area and a second circular area can be obtained on a laser scanning plane (i.e., a plane formed by a laser beam scanning one circle), with a rotation shaft O connecting the tractor and the trailer as a center and the first distance L1 and the second distance L2 as radii, respectively. An area range outside the first circular area and inside the second circular area can be determined as a predetermined area range S. The reason behind such setting is that the reflector will always be in an annular area as the trailer moves around the tractor. Therefore, the first distance L1 and the second distance L2 can be predetermined, and the predetermined area range S can be obtained with the rotation shaft O as the center and the first distance L1 and the second distance L2 as the radii, respectively.

At step 404, noise filter is performed on the laser point cloud within the predetermined area range to obtain a noise filtered laser point cloud corresponding to each of the LiDARs.

Here, the noise filtering can be used to filter out outliers, so as to obtain a more accurate laser point cloud.

At step 405, a Random Sample Consensus (RANSAC) algorithm is applied to the noise filtered laser point cloud corresponding to each of the LiDARs to obtain one or more straight line segments formed by laser point clouds corresponding to the LiDAR, and a longest straight line segment corresponding to the LiDAR is determined from the one or more straight line segments formed by laser point clouds.

Since the noise filtered laser point cloud corresponding to each of the LiDARs does not necessarily contain only the laser point cloud reflected by the reflector, but may also contain laser point clouds reflected from other positions (such as bumps on the left and right sides of the reflector), it is desired to obtain one or more straight line segments formed by laser point clouds corresponding to the LiDAR using the RANSAC algorithm, and determine the longest straight line segment corresponding to the LiDAR from the one or more straight line segments formed by laser point clouds.

At step 406, a straight line equation of the longest straight line segment corresponding to each of the LiDARs and the number of points in the laser point cloud forming the longest straight line segment are determined in a LiDAR coordinate system.

At step 407, the initial trailer angle corresponding to each of the LiDARs is calculated based on the straight line equation of the longest straight line segment corresponding to the LiDAR.

Figure 10:
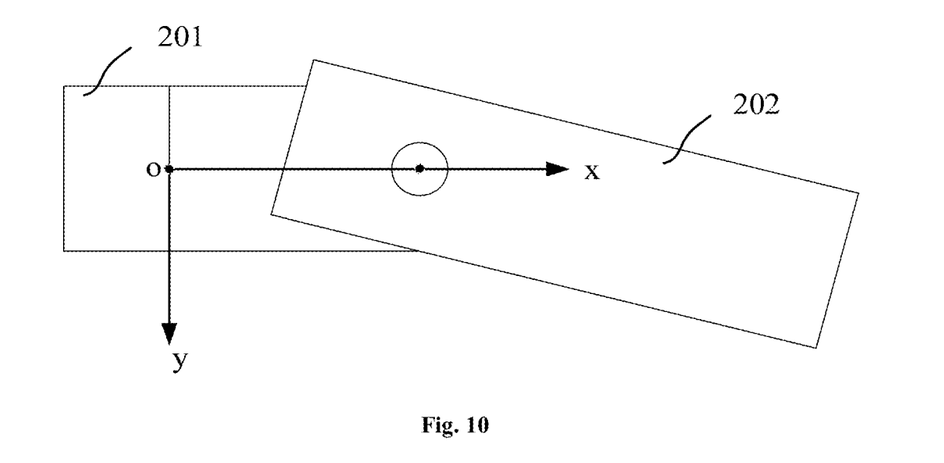
FIG. 10 is a schematic diagram showing a LiDAR coordinate system established according to an embodiment of the present disclosure.

In an embodiment of the present disclosure, after the LiDARs are installed, a LiDAR coordinate system is established. The position information of the laser point clouds of the LiDARs is based on the LiDAR coordinate system. For example, the LiDAR coordinate system as shown in FIG. 10 can be established, and the present disclosure is not limited to this. In the establishment of the LiDAR coordinate system, another direction can be selected as the x-axis, and a direction perpendicular to the x-axis on the horizontal plane can be the y-axis, and further details will be omitted here.

Figure 11:
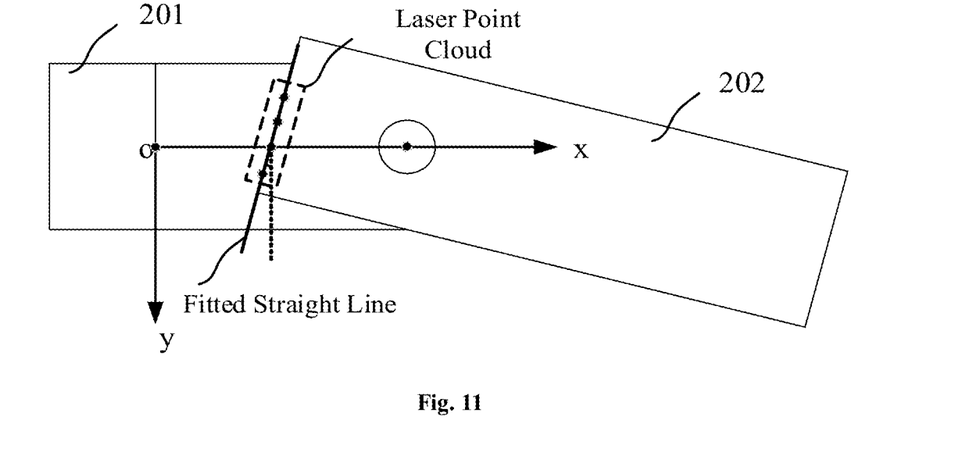
FIG. 11 is a schematic diagram of a longest straight line segment in a LiDAR coordinate system established according to an embodiment of the present disclosure.

In an example, the step 406 of determining the straight line equation of the longest straight line segment corresponding to each of the LiDARs and the number of points in the laser point cloud forming the longest straight line segment in the LiDAR coordinate system and the step 407 of calculating the initial trailer angle corresponding to each of the LiDARs based on the straight line equation of the longest straight line segment corresponding to the LiDAR can be implemented as follows. The straight line segments can be fitted according to the received laser point clouds, and the straight line equation of the longest straight line segment can be fitted according to the longest straight line segments. An inverse trigonometric function (typically arctangent or arccotangent) based calculation is performed on the slope of the straight line equation to obtain the initial trailer angle, as shown in FIG. 11.

At step 408, the initial trailer angles corresponding to the respective LiDARs are screened in accordance with a predetermined determination condition.

Here, the step 408 can be implemented in any of the following two schemes. Of course, it can alternatively be implemented in a combination of the two schemes:

Scheme 1

It can be determined whether the number of points in the laser point cloud of the longest straight line segment corresponding to each of the LiDARs is smaller than a predetermined number threshold.

The initial trailer angle corresponding to any LiDAR having the number of points in the laser point cloud of the longest straight line segment smaller than the predetermined number threshold can be discarded, and the initial trailer angle corresponding to each LiDAR having the number of points in the laser point cloud of the longest straight line segment greater than or equal to the predetermined number threshold can be retained.

Here, if the number of points in the laser point cloud of the longest straight line segment is smaller than the predetermined number threshold, it means that the longest line segment is fitted using a relatively small number of laser point clouds. If the longest straight line segment is fitted using only few laser point clouds, the obtained initial trailer angle may be highly inaccurate and should be discarded.

Scheme 2

When the current period is not a first period, it can be determined whether an angle deviation value between the initial trailer angle corresponding to each of the LiDARs in the current period and a Kalman filtered trailer angle obtained in a previous period is greater than a predetermined angle deviation threshold.

The initial trailer angle corresponding to any LiDAR in the current period can be discarded when the angle deviation value between the initial trailer angle corresponding to the LiDAR in the current period and the Kalman filtered trailer angle obtained in the previous period is greater than the predetermined angle deviation threshold.

The initial trailer angle corresponding to each LiDAR in the current period can be retained when the angle deviation value between the initial trailer angle corresponding to the LiDAR in the current period and the Kalman filtered trailer angle obtained in the previous period is smaller than or equal to the predetermined angle deviation threshold.

Here, since the time difference between two consecutive periods is small (typically only 0.1 seconds), the trailer angle will not change significantly. Therefore, if the angle deviation value between the initial trailer angle corresponding to the LiDAR in the current period and the Kalman filtered trailer angle obtained in the previous period is greater than the predetermined angle deviation threshold, it can be determined that the initial trailer angle corresponding to the LiDAR in the current period is invalid and should be discarded.

At step 409, the screened initial trailer angles corresponding to the respective LiDARs are sorted based on collecting time in a current period to form angle data to be processed.

Figure 12:
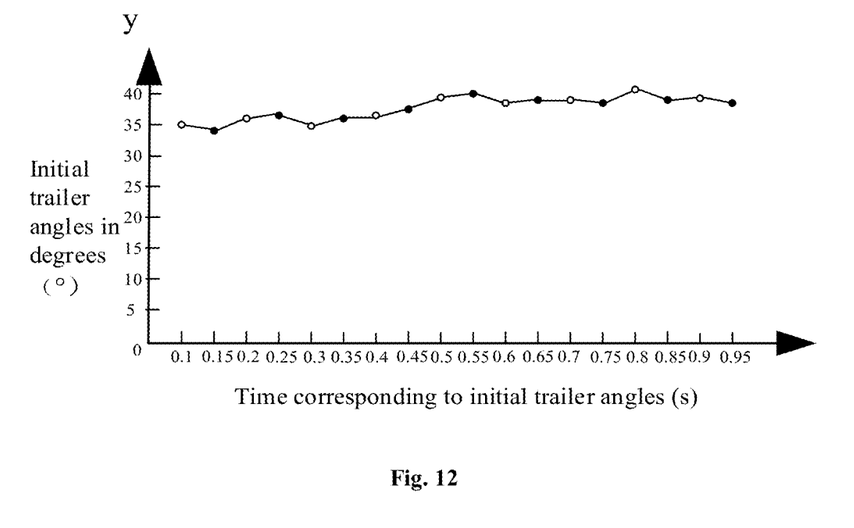
FIG. 12 is a schematic diagram showing a curve of angle data to be processed according to an embodiment of the present disclosure.

For example, when one LiDAR is provided on each of the left and right sides of the rear part of the tractor and the measurement period of the LiDARs is 0.1 s, as shown in FIG. 12, the abscissa represents time corresponding to the initial trailer angles, and the ordinate represents the initial trailer angles in degrees, and the entire ordinate data constitutes the angle data to be processed.

At step 410, Kalman filter is performed on the angle data to be processed to obtain a trailer angle of the current period.

The reason behind the Kalman filtering here is to deal with manufacturing errors of the reflector. The reflector itself cannot be guaranteed to be absolutely flat, and the LiDARs themselves also have observation errors, resulting in some errors in the calculated initial trailer angles. This phenomenon is manifested as jumps of ±1° to 2° in the angles when the vehicle is stationary. In order to solve this problem, Kalman filtering can be used to reduce the noise in the initial trailer angles sorted based on the collecting time in the angle data to be processed, and fuse the initial trailer angles and a simple kinematics model of angle changes to obtain a smooth output result. In this way, it can not only ensure that the errors in the measured data of the trailer angles measured in the stationary state is within ±0.5°, but also ensure that the measured data can change accordingly in real time when the trailer angle changes rapidly, so as to avoid obvious delays.

After the above step 410, the method can return to the step 401 for the next cycle of trailer angle measurement.

In addition, an embodiment of the present disclosure provides an apparatus for trailer angle measurement. The apparatus includes a memory, a processor, and a computer program stored on the memory and executable by the processor. The processor is configured to, when executing the computer program, the above method corresponding to FIG. 2 or 8.

In addition, an embodiment of the present disclosure also provides a computer readable storage medium. The computer readable storage medium has a computer program stored thereon. The program, when executed by a processor, implements the above method corresponding to FIG. 2 or 8.

Figure 13:
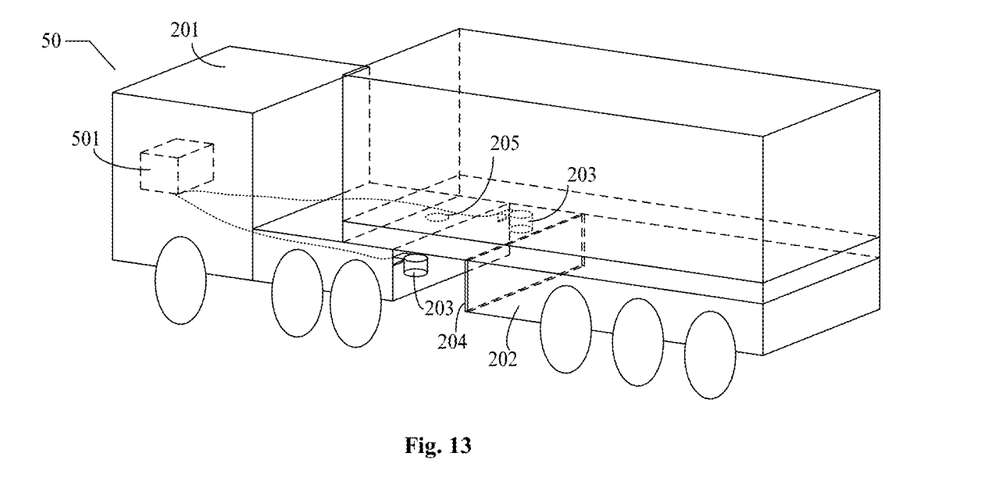
FIG. 13 is a schematic diagram showing a structure of a vehicle according to an embodiment of the present disclosure.

In addition, as shown in FIG. 13, an embodiment of the present disclosure also provides a vehicle 50. The vehicle 50 includes the above apparatus 501 for trailer angle measurement, a tractor 201, and a trailer 202 (the trailer 202 in the present disclosure may or may not carry a container). At least one LiDAR 203 is provided on each of two sides of a rear part of the tractor 201. A reflector 204 with a reflective surface is fixedly provided at a front part of the trailer 202, and the reflective surface faces the LiDARs 203. The apparatus 501 for trailer angle measurement is communicatively connected to the LiDARs 203.

Figure 14:
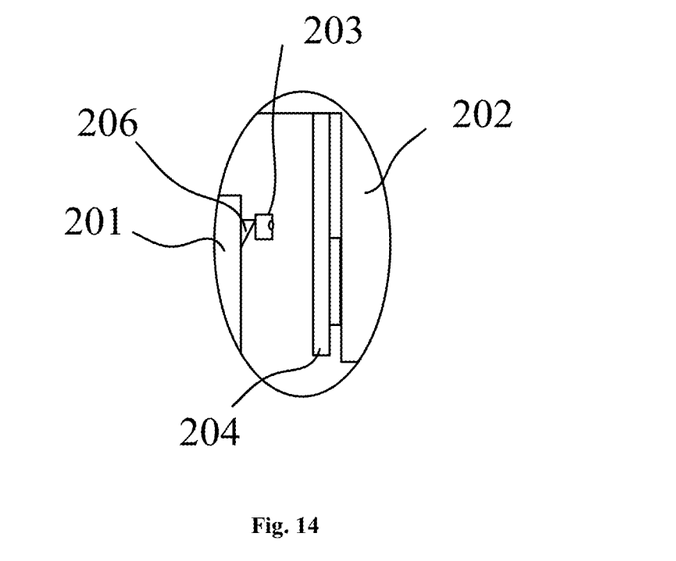
FIG. 14 is a schematic diagram showing a structure of a rear area of a tractor according to an embodiment of the present disclosure.

Further, as shown in FIG. 14, each of the two sides of the rear part of the tractor 201 is fixedly connected to the at least one LiDAR 203 by a first fastener. Moreover, the first fastener may be a first support beam 206 fixed to a cross beam at the rear part of the tractor 201. Each of the LiDARs 203 is fixed to a side of the first support beam 206 that faces away from the tractor 201 and is configured to emit the laser light towards the reflector 204.

With the method and apparatus for trailer angle measurement and the vehicle according to the embodiments of the present disclosure, at least one LiDAR is provided on each of two sides of a rear part of the tractor. In this way, when the trailer angle is relative large and the reflector moves to one side of the tractor, the laser light emitted by the LiDAR(s) on at least one side can still reach the reflective surface of the reflector for measurement of the trailer angle. In addition, in the present disclosure, the trailer angle is calculated based on the corresponding laser point clouds received by the respective LiDARs, instead of a laser point cloud of a single LiDAR, such that the accuracy of the result is greatly improved.

The basic principles of the present disclosure have been described above with reference to the embodiments. However, it can be appreciated by those skilled in the art that all or any of the steps or components of the method or device according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiments.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for trailer angle measurement, applied in a vehicle comprising a tractor and a trailer, at least two LiDAR being provided on a rear of the tractor, a reflector with a reflective surface being fixedly provided at a front of the trailer, and the reflective surface facing the LiDARs, the method comprising:
controlling the LiDARs to emit laser light, such that the reflective surface of the reflector reflects the laser light emitted by the LiDARs;
controlling the LiDARs to receive laser light reflected by the reflector respectively and obtaining laser point clouds based on the laser light; and
calculating a trailer angle based on the laser point clouds.

2. The method of claim 1, wherein the said calculating the trailer angle based on the laser point clouds comprises:
processing the laser point clouds to obtain initial trailer angles; and
screening the initial trailer angles in accordance with a predetermined determination condition.

3. The method of claim 2, wherein the said calculating the trailer angle based on the laser point clouds further comprises:
sorting the screened initial trailer angles based on collecting times in a current collecting period to obtain angle data to be processed, wherein the collecting times are times when the LiDARs receive the laser light respectively; and
performing Kalman filter on the angle data to be processed to obtain the trailer angle of the current collecting period.

4. The method of claim 2, wherein the said processing the laser point clouds to obtain the initial trailer angles comprises:
performing area of interest (AOI) filter on the laser point clouds to obtain AOI filtered laser point clouds within a predetermined area range, the predetermined area range being determined based on a range of motion of the reflector around the tractor; and
performing noise filter on the AOI filtered laser point clouds to obtain noise filtered laser point clouds corresponding to the LiDARs respectively.

5. The method of claim 4, wherein the said processing the laser point clouds to obtain the initial trailer angles further comprises:
applying a random sample consensus (RANSAC) algorithm to the noise filtered laser point clouds to obtain one or more straight line segments formed by the noise filtered laser point cloud for each of the LiDARs, and determining a longest straight line segment for each of the LiDARs from the one or more straight line segments;

determining, in a LiDAR coordinate system, a straight line equation of the longest straight line segment and a number of points in the laser point cloud forming the longest straight line segment for each of the LiDARs; and calculating a initial trailer angle based on the straight line equation of the longest straight line segment for each of the LiDARs.

6. The method of claim 4, further comprising:

predetermining a first distance and a second distance based on the range of motion of the reflector around the tractor, the second distance being greater than the first distance;

obtaining a first circular area and a second circular area on a laser scanning plane, with projection of a rotation shaft connecting the tractor and the trailer on the laser scanning plane as a center and the first distance and the second distance as radii, respectively; and determining an area range outside the first circular area and inside the second circular area as the predetermined area range.

7. The method of claim 5, wherein the said screening the initial trailer angles in accordance with a predetermined condition comprises:

determining whether the number of points in the laser point cloud forming the longest straight line segment corresponding to each of the LiDARs is smaller than a predetermined number threshold; and discarding one of the initial trailer angles corresponding to any one of the LiDARs having the number of points in the laser point cloud forming the longest straight line segment smaller than the predetermined number threshold.

8. The method of claim 5, wherein the said screening the initial trailer angles in accordance with a predetermined condition comprises:

determining, when a current collecting period is not a first collecting period, whether an angle deviation value between each of the initial trailer angles in the current collecting period and a trailer angle obtained in a previous collecting period is greater than a predetermined angle deviation threshold respectively; and discarding one of the initial trailer angles in the current collecting period whose angle deviation value is greater than the predetermined angle deviation threshold.

9. An apparatus for trailer angle measurement, applied in a vehicle comprising a tractor and a trailer, at least two LiDARs being provided on a rear of the tractor, a reflector with a reflective surface being fixedly provided at a front of the trailer, the reflective surface facing the LiDARs, the apparatus being communicatively connected to the LiDARs, and the apparatus comprising a memory, a processor, and a computer program stored on the memory and executable by the processor, wherein the processor is configured to, when executing the computer program, perform a process of trailer angle measurement, the process comprising:

controlling the LiDARs to emit laser light, such that the reflective surface of the reflector reflects the laser light emitted by the LiDARs;

controlling the LiDARs to receive laser light reflected by the reflector respectively and obtaining laser point clouds based on the laser light; and calculating a trailer angle based on the laser point clouds.

10. The apparatus of claim 9, wherein the said calculating the trailer angle based on the laser point clouds comprises:

processing the laser point clouds to obtain initial trailer angles; and screening the initial trailer angles in accordance with a predetermined determination condition.

11. The apparatus of claim 10, wherein the said calculating the trailer angle based on the laser point clouds further comprises:

sorting the screened initial trailer angles based on collecting times in a current collecting period to obtain angle data to be processed, wherein the collecting times are times when the LiDARs receive the laser light respectively; and performing Kalman filter on the angle data to be processed to obtain the trailer angle of the current collecting period.

12. The apparatus of claim 10, wherein the processing the laser point clouds to obtain the initial trailer angles comprises:

performing area of interest (AOI) filter on the laser point clouds to obtain AOI filtered laser point clouds within a predetermined area range, the predetermined area range being determined based on a range of motion of the reflector around the tractor; and performing noise filter on the AOI filtered laser point clouds to obtain noise filtered laser point clouds corresponding to the LiDARs respectively.

13. The apparatus of claim 12, wherein the said processing the laser point clouds to obtain the initial trailer angles further comprises:

applying a random sample consensus (RANSAC) algorithm to the noise filtered laser point clouds to obtain one or more straight line segments formed by the noise filtered laser point cloud for each of the LiDARs, and determining a longest straight line segment for each of the LiDARs from the one or more straight line segments;

determining, in a LiDAR coordinate system, a straight line equation of the longest straight line segment and a number of points in the laser point cloud forming the longest straight line segment for each of the LiDARs; and calculating a initial trailer angle based on the straight line equation of the longest straight line segment for each of the LiDARs.

14. The apparatus of claim 12, wherein the process of trailer angle measurement further comprises:

predetermining a first distance and a second distance based on a range of motion of the reflector, the second distance being greater than the first distance;

obtaining a first circular area and a second circular area on a laser scanning plane, with projection of a rotation shaft connecting the tractor and the trailer on the laser scanning plane as a center and the first distance and the second distance as radii, respectively; and determining an area range outside the first circular area and inside the second circular area as the predetermined area range.

15. The apparatus of claim 13, wherein the screening the initial trailer angles in accordance with a predetermined condition comprises:

determining whether the number of points in the laser point cloud forming the longest straight line segment corresponding to each of the LiDARs is smaller than a predetermined number threshold; and discarding one of the initial trailer angles corresponding to any one of the LiDARs having the number of points in the laser point cloud forming the longest straight line segment smaller than the predetermined number threshold.

16. The apparatus of claim 13, wherein the screening the initial trailer angles in accordance with a predetermined condition comprises:
determining, when a current collecting period is not a first collecting period, whether an angle deviation value between each of the initial trailer angles in the current collecting period and a trailer angle obtained in a previous collecting period is greater than a predetermined angle deviation threshold respectively; and
discarding one of the initial trailer angles in the current collecting period whose angle deviation value is greater than the predetermined angle deviation threshold.

17. A computer readable storage medium, having a computer program stored thereon, wherein the program, when executed by a processor, implements a process of trailer angle measurement, the process being applied in a vehicle comprising a tractor and a trailer, at least two LiDARs being provided on a rear part of the tractor, a reflector with a reflective surface being fixedly provided at a front part of the trailer, the reflective surface facing the LiDARs, the process comprising:
controlling the LiDARs to emit laser light, such that the reflective surface of the reflector reflects the laser light emitted by the LiDARs;
controlling the LiDARs to receive laser light reflected by the reflector respectively and obtaining laser point clouds based on the laser light; and
calculating a trailer angle based on the laser point clouds.

18. The computer readable storage medium of claim 17, wherein the said calculating the trailer angle based on the laser point clouds comprises:
processing the laser point clouds to obtain initial trailer angles; and
screening the initial trailer angles in accordance with a predetermined determination condition.

19. The computer readable storage medium of claim 18, wherein the said calculating the trailer angle based on the laser point clouds further comprises:
sorting the screened initial trailer angles based on collecting times in a current collecting period to obtain angle data to be processed, wherein the collecting times are times when the LiDARs receive the laser light respectively; and
performing Kalman filter on the angle data to be processed to obtain the trailer angle of the current collecting period.

20. The computer readable storage medium of claim 18, wherein the said processing the laser point clouds to obtain the initial trailer angles comprises:
performing area of interest (AOI) filter on the laser point clouds to obtain AOI filtered laser point clouds within a predetermined area range, the predetermined area range being determined based on a range of motion of the reflector around the tractor;
performing noise filter on the AOI filtered laser point clouds to obtain noise filtered laser point clouds corresponding to the LiDARs respectively;
applying a random sample consensus (RANSAC) algorithm to the noise filtered laser point clouds to obtain one or more straight line segments formed by the noise filtered laser point cloud for each of the LiDARs, and determining a longest straight line segment for each of the LiDARs from the one or more straight line segments;
determining, in a LiDAR coordinate system, a straight line equation of the longest straight line segment and a number of points in the laser point cloud forming the longest straight line segment for each of the LiDARs; and
calculating the initial trailer angle based on the straight line equation of the longest straight line segment for each of the LiDARs.

* * * * *